United States Patent
Iversen

(10) Patent No.: US 10,108,207 B2
(45) Date of Patent: Oct. 23, 2018

(54) PRESSURE REDUCTION DEVICE AND METHOD

(71) Applicant: STEEPER ENERGY APS, Hørsholm (DK)

(72) Inventor: Steen Brummerstedt Iversen, Vedbæk (DK)

(73) Assignee: STEEPER ENERGY APS, Hørsholm (DK)

( * ) Notice: Subject to any disclaimer, the term of this patent is extended or adjusted under 35 U.S.C. 154(b) by 166 days.

(21) Appl. No.: 14/889,518

(22) PCT Filed: May 8, 2014

(86) PCT No.: PCT/IB2014/061293
§ 371 (c)(1),
(2) Date: Nov. 6, 2015

(87) PCT Pub. No.: WO2014/181283
PCT Pub. Date: Nov. 13, 2014

(65) Prior Publication Data
US 2016/0091901 A1    Mar. 31, 2016

(30) Foreign Application Priority Data

May 8, 2013    (DK) ................... 2013 00282

(51) Int. Cl.
*G05D 16/20*    (2006.01)
*G05D 16/04*    (2006.01)
*F16L 55/027*    (2006.01)

(52) U.S. Cl.
CPC .......... *G05D 16/204* (2013.01); *F16L 55/027* (2013.01); *G05D 16/04* (2013.01)

(58) Field of Classification Search
CPC .... G05D 16/204; G05D 16/04; G05D 55/027; F16L 55/027
See application file for complete search history.

(56) References Cited

U.S. PATENT DOCUMENTS 9,442,495 B2 *    9/2016    Van Doorn ............... F17C 7/00

FOREIGN PATENT DOCUMENTS

WO    WO 2012/167789 A2    12/2012
WO    WO 2012/167794 A2    12/2012

OTHER PUBLICATIONS

"Oil Flow Capacity of Pipe & Tubing", In: "JHF Pneumatic and Hydraulic Equipment", John Henry Foster, www.jhf.com, 2008-2009 Master Catalog, p. 1359, retrieved from https://web.archive.org/web/20110324002341/http://www.jhf.com:80/electroniccatalog/index.asp.
"Pipe Sizing"; Chapter 22, In: "2009 ASHRAE Handbook—Fundamentals (Inch-Pound Edition)", Feb. 12, 2009, ASHRAE, Atlanta USA, XP002727595, ISNB: 978-1-933742-54-0, pp. 22.1-22.23.

* cited by examiner

*Primary Examiner* — Kevin Lee
(74) *Attorney, Agent, or Firm* — Birch, Stewart, Kolasch & Birch, LLP

(57) ABSTRACT

The invention relates to a pressure reduction device for use in processing equipment handling high pressure and high temperature fluids with a content of abrasive components, where the pressure reduction device comprises a number of pipes with a length and internal cross section adapted to reduce the pressure, where the length, the cross sectional area and the number of pipes are chosen to have an average flow velocity within each pipe of less than 30 m/s.

21 Claims, 5 Drawing Sheets

PRESSURE REDUCTION DEVICE AND METHOD

FIELD OF THE INVENTION

The present invention relates to the area of pressure reduction devices for use in a high pressure and high temperature processing equipment.

BACKGROUND OF THE INVENTION

In high pressure and high temperature processing equipment a need exists to reduce the pressure after the processing and before output of the processed product. For this purpose various pressure reduction devices in the form of valves exist with properties making these resistant to the high pressure and temperatures. By the terms high pressure and high temperature it should be appreciated that the highest pressure will normally be above 150 Bar and the temperature will be above 250° C. The temperature of the processed product may be lower at the pressure reduction location due to a desire of recycling the heat to the early stages of the process.

When reducing the pressure in such processes extensive wear of valve parts, i.e. the valve and the seat, is observed due to the high velocities in the valve in order to provide the required pressure reduction. The wear is further increased when processing materials with a content of abrasive particles. Using more valves in order to allow lower velocities will dramatically increase the cost of the processing equipment and will not totally eliminate the problem of wear.

Hence, an improved pressure reduction device and a method would be advantageous, and in particular a pressure reduction device and a method that provide for a more efficient pressure reduction and/or are less prone to wear from high flow velocities of processed fluids with abrasive components.

SUMMARY OF THE INVENTION

Accordingly, the invention preferably seeks to mitigate, alleviate or eliminate one or more of the above mentioned disadvantages singly or in any combination. In particular, it may be seen as an object of the present invention to provide a pressure reduction device that is suitable for use in a system where a content of abrasive particles would cause abasion of the normal pressure reduction device.

This objective of the invention is obtained in a first aspect of the invention by providing a pressure reduction for use in processing equipment handling high pressure fluid, where the pressure reduction device comprises at least one tubular element with a first and a second end, arranged to receive a pressurized fluid at the first end and with a length and internal cross section adapted to reduce the pressure of the fluid to a predetermined level when leaving the second end, where the length, the cross sectional area and the number of tubular elements are chosen to achieve an average flow velocity within each tubular element of less than 30 m/s.

The actual pressure reduction in the pressure reduction device will depend on the number of tubular elements and further on the length and the cross sectional area available for flow, i.e. the inner area. Preferably the length, the cross sectional area and the number of tubular elements are chosen to achieve an average flow velocity within each tubular element of less than 20 m/s, more preferred less than 15 m/s and most preferred less than 10 m/s.

Preferably the internal diameter of each tubular element is in the range 1 mm to 32 mm, preferably in the range 1 mm to 25 mm. Desirably the range is within 1 mm and 16 mm, preferably 1.7 mm to 12 mm and most desired 2.5 mm to 10 mm. An equivalent cross sectional area for tubular elements having a profile deviating from a circular profile may apply.

Preferably the length of each tubular element is 10 m to 1000 m, preferably 10 m to 500 m, more preferred 10 m to 250 m and most preferred 10 m to 100 m.

A further aspect of the invention relates to a pressure reduction unit enabling stepwise pressure reduction using a combination of the pressure reduction devices according to the invention.

According to the invention this aspect is realized through a pressure reduction unit comprising two or more pressure reduction devices according to the preceding claims are arranged in series in a piping arrangement connecting these and directing the fluid to the pressure reduction devices, where for a pressure reduction device a flow bypass piping comprising an on/off valve may be provided and where pressure measuring devices are provided adapted for measuring the pressure before and after the pressure reduction in each pressure reduction device. This will allow for selection of a specific combination of pressure reduction devices for a specific pressurized fluid to be treated in the pressure reduction device. The cross sectional areas of the tubular elements may vary from one pressure reduction device to the next. Also the length and the number of tubular elements may vary between the individual pressure reduction devices.

Preferably the pressure reduction unit is adapted for automatic operation through further comprising a control unit, where a pressure measuring device is adapted for providing an input to a control unit, where the control unit is adapted to provided a control signal to valve activation devices for opening or closing the on/off valve according to a predetermined control strategy residing in the control unit.

In a further embodiment a heating device for one or more of the pressure reduction devices is provided for heating the pressure reduction device and hereby adjusting the viscosity of the fluid and hence adjusting the pressure reduction. This gives a possibility of a more precise adjustment of the pressure reduction.

Preferably the number of pressure reduction devices is at least 4, preferably 6 and even more preferred 8 and where an on/off valve is placed in conjunction with each pressure reduction unit.

Preferably a pressure reduction device adapted for pre-operation procedures is provided, where the medium to be pressure reduced is water or a similar low viscosity fluid.

In a further embodiment there is for one or more of the serially connected pressure reduction devices a parallel coupled pressure reduction device provided in a parallel piping arrangement, and further valve means are provided for opening and closing the flow to the parallel coupled pressure reduction device. Such arrangement will increase availability of the pressure reduction unit, as the additional device may be switched in, e.g. when the other device is in need of maintenance, and further the capacity may be increased if both parallel coupled devices are switched in, i.e. open for flow.

In a further embodiment for one or more of the pressure reduction devices a flushing device is provided, capable of flushing the pressure reduction device when not in an operational mode. In particular this will apply to a configuration where the pressure reduction unit comprises parallel arranged pressure reduction devices, that may be coupled in or out for flushing or other maintenance.

In a further embodiment a filtering device is inserted in the piping upstream in relation to the first pressure reduction device. Hereby potentially obstructing elements, e.g. stones, larger fibres or coke originating from the process, may be kept out of the pressure reduction unit and hereby avoiding clogging of the pressure reduction system.

In a further aspect of the invention the pressure reduction unit according to the invention is operated according to an inventive method.

The method according to the invention for operating the processing equipment comprising a pressure reduction unit according to the invention, is characterized by that the pressure reduction method comprises switching in or out one or more on/off valves in bypass streams and hence directing the fluid stream to a desired combination of pressure reduction devices.

According to the invention the method for pressure reduction comprises
  a. measuring the pressure in the fluid at a pressure reduction device;
  b. dependent on the pressure measurement performing one of steps c. or d through operation of the control unit;
  c. directing the fluid to the pressure reduction device;
  d. bypassing the pressure reduction device by opening the on/off valve in the bypass piping;
  e. repeating the step e. for each pressure reduction device until a predetermined pressure level has been reached.

Preferably the method comprises bypassing all but a final pressure reduction device in case the fluid in the processing equipment is a low viscosity startup or close down fluid.

In a further embodiment the temperature is in one or more steps of the pressure reduction increased relative to the input temperature of the fluid.

In this case the temperature is preferably increased to between 120° C. and 180° C. In any case it is crucial that the temperature is kept above 80° C., in order to avoid heavier components in the fluid to coagulate and form potentially obstructing objects.

The pressure reduction unit may find use in a processing plant comprising a number of such pressure reduction units, where the processing plant comprises on the one side of the pressure reduction unit a high pressure liquid reaction zone and on the other side of the pressure reduction device comprises a liquid separation zone. This may for example be a processing plant for converting material containing carbonaceous parts into a liquid hydrocarbon in a continuous process. Such fluid stream will contain a significant amount of abrasive particles, and due to the absence of moving parts that are influenced by these particles it will allow for a significant reduction of interruption in the process and hence be able to actually make a steady long term continuous process available.

The invention is particularly, but not exclusively, advantageous for obtaining a reliable and consistent pressure reduction in a high pressure system where a content of abrasive particles is present in a fluid.

DESCRIPTION OF THE DRAWINGS

The present invention will now be explained, by way of example only, with reference to the accompanying Figures, where.

DETAILED DESCRIPTION OF AN EMBODIMENT

Figure 1:
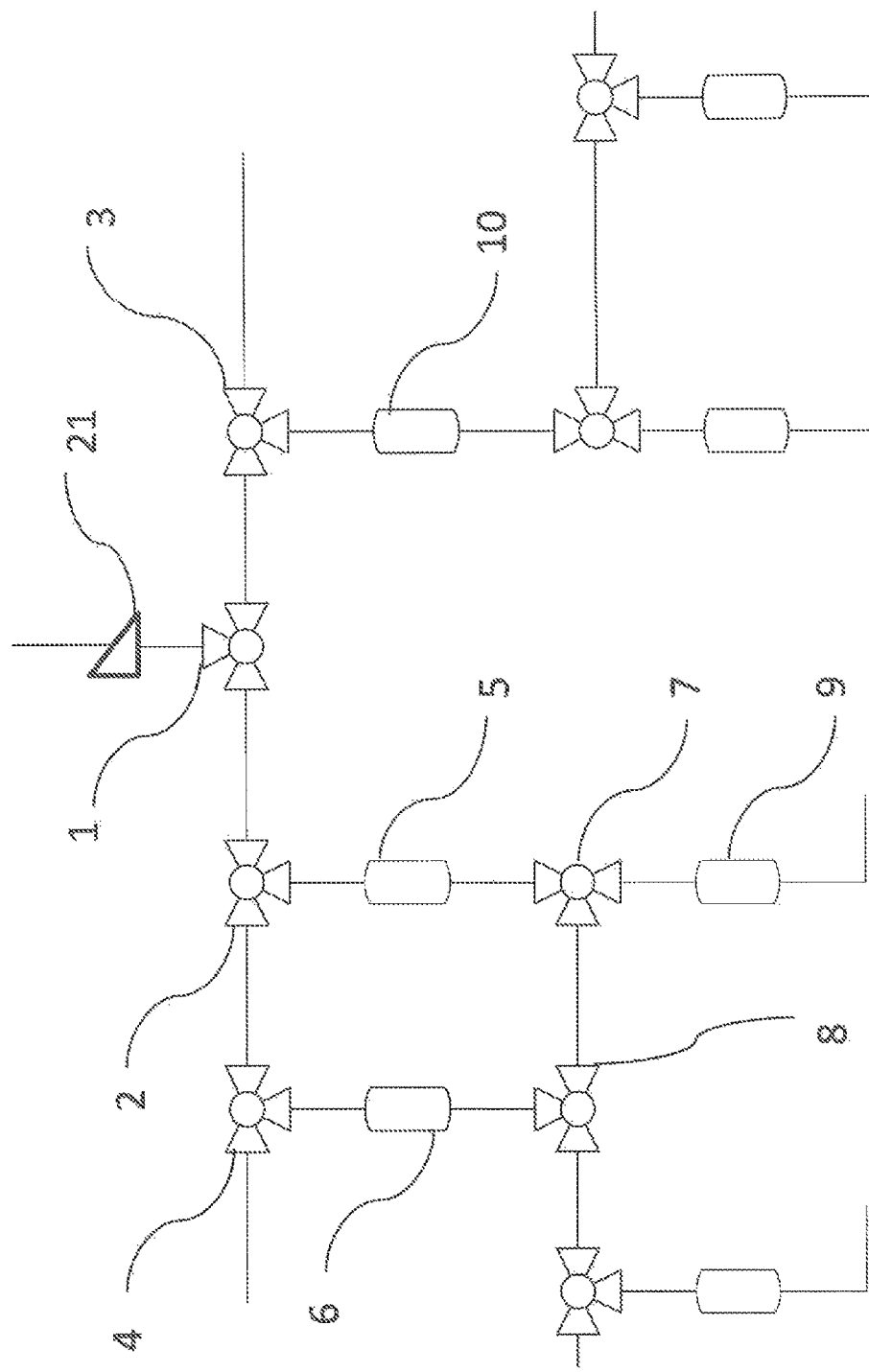
FIG. 1 shows a schematic configuration of a pressure reduction unit according to the invention.

From FIG. 1 a schematic view of a pressure reduction unit appears, where the configuration of the pressure reduction devices and the connecting piping and valves are visible. The diameter of each tubular element of the pressure reduction device and further the length of these are determined according to process parameters, where the design criterium preferably is so that the average flow velocity in a tubular element is kept below 30 m/s, preferably even lower e.g. 20 m/s or 10 m/s. Prior to the pressure reduction devices a screen or filter 21 has been introduced in the flow system in order to filter out possible larger components. A first valve 1 distributes the flow to further valves 2,3 through piping, where valves 2,3 each controls access to a string of pressure reduction devices, for valve 2 the pressure reduction devices 5,9, etc and for valve 3 pressure reduction devices 10, etc. The valve 2 may additionally control access to additional strings available through valve 4. Valves 7,8 indicate that access to parallel pressure reduction devices may be available in case a need for maintenance exists for a particular pressure reduction device, where the access to such for that reason may need to be shut down. For example in case pressure reduction device 5 is shut down through closure of valves 2,7, the flow may be directed to pressure reduction device 6 and back to pressure reduction device 9 for pressure reduction through operation of the valves 2, 4, 8, 7.

Figure 2:
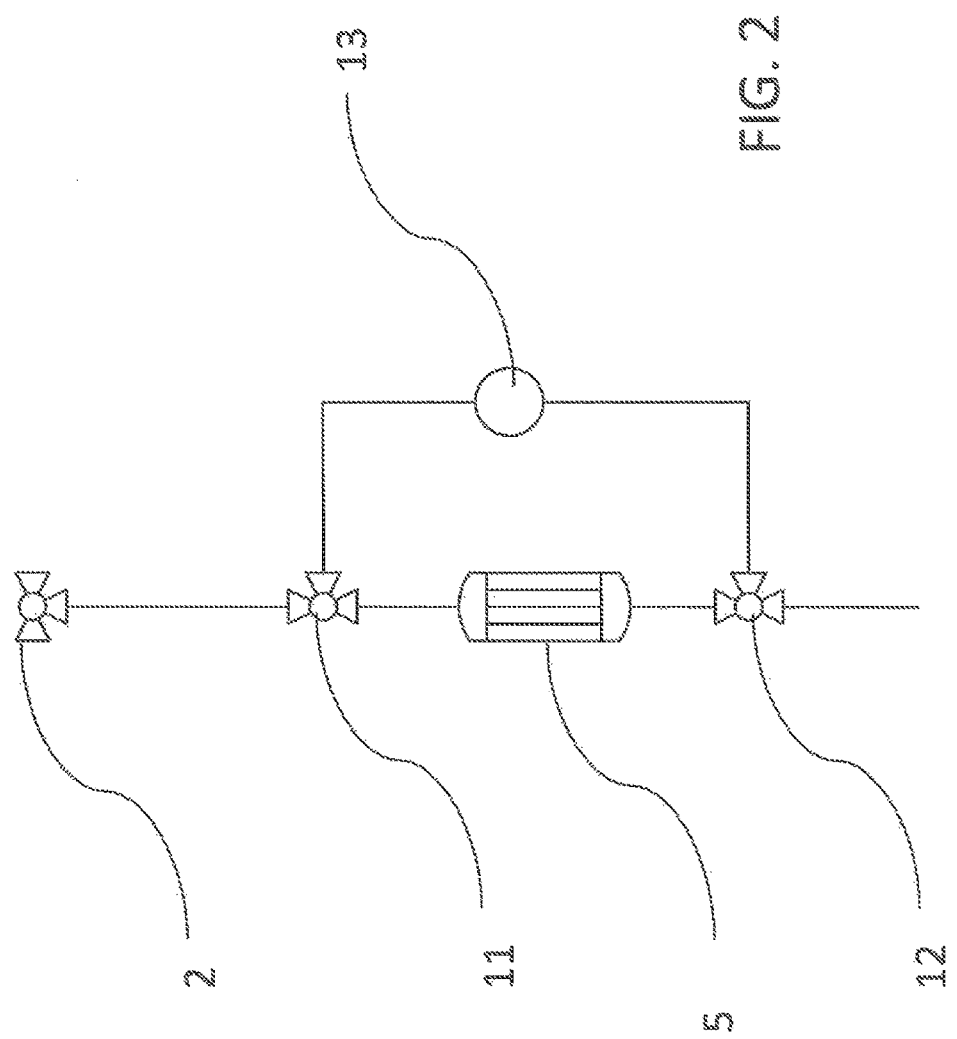
FIG. 2 shows schematically a single step pressure reduction device according to the invention.

From FIG. 2 a pressure reduction device of a pressure reduction unit appears schematically. It appears that above and below the pressure reduction device 5 valves 11,12 are provided that connect a flushing system comprising a pump 13 and suitable piping connecting the pump to the valves. The flushing preferably is carried out in an opposite direction of the normal flow direction of the pressure reduction device as the main location of the obstruction to be removed normally is at the inlet of the tubular element(s) of the pressure reduction device. The flushing operation may be carried out when the pressure reduction device is closed out of the pressure reduction unit, i.e. when valves have closed the high pressure process system in relation to the pressure reduction device.

Figure 3:
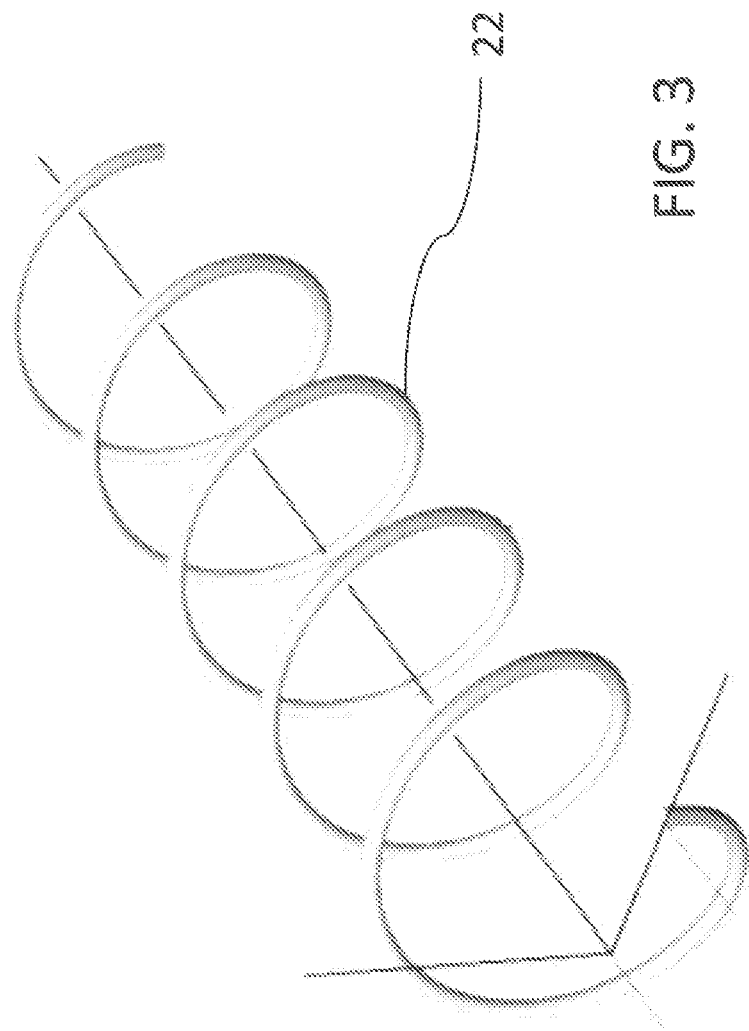
FIG. 3 shows in perspective a pressure reduction device according to the invention.

From FIG. 3 the same pressure reduction device as shown in FIG. 1 appears schematically. The tubular elements 22 may be elongate straight elements, however in order to reduce space consumption other shapes may be chosen, e.g. a coil shaped or a helix shaped element 22 may reduce the space needed significantly. The length and cross sectional area are only shown for schematic purposes as the actual desired measures of the tubular elements are much different from these shown examples. For example the desired length may be between 1 m and 1000 m, dependent on the cross sectional area and the number of tubular elements provided. Further the cross sectional area may vary within the range of areas corresponding to a diameter of between 1 mm and 10 mm in a circular tubular element. Again the parameters that are variable are the number of tubes, the cross sectional area and the length, where these design parameter will be the desired flow velocity through each tubular element.

Figure 4:
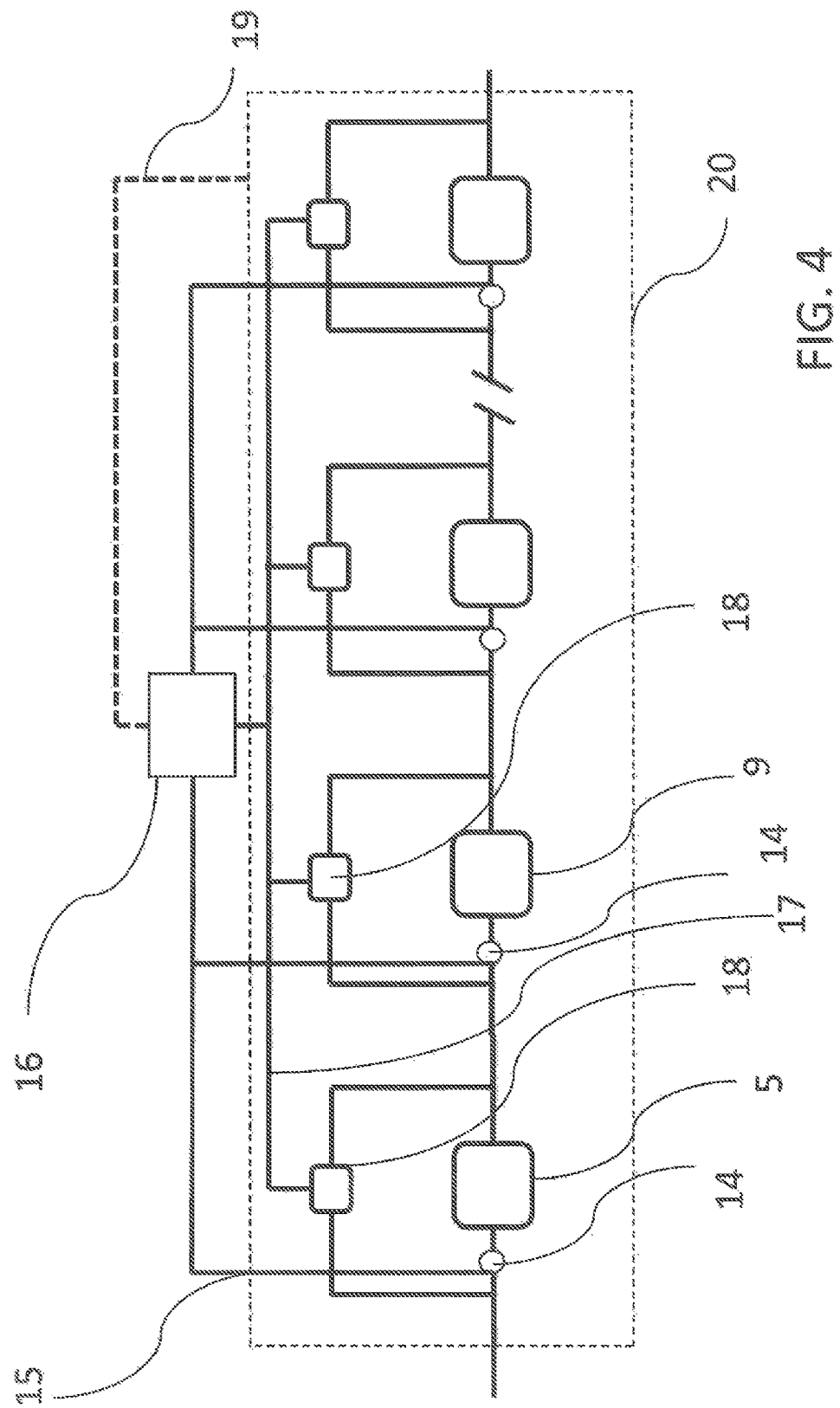
FIG. 4 shows a schematic diagram with the pressure reduction device according to the invention built into a high pressure process plant.

FIG. 4 shows an embodiment of a string of pressure reduction devices 5,9, etc forming a pressure reduction unit according to the invention, where a multistage layout is introduced. In this case four stages or pressure reduction devices are used, where the individual stages in their function follow the single step, however where the pressure drop over the individual stage is smaller than in the single step embodiment, and where the resistance to wear is even more significant. For each pressure reduction device a bypass piping 23 is provided and for each bypass piping 23 an on/off closing valve 18 is provided. A pressure sensor 14 is provided for measuring the fluid pressure and provides an input to a control unit 16 that will determine the opening or closing of one or more valves 14 according to a predetermined control strategy by providing a control signal through signal path 17. The last pressure reduction device shown is preferably only used for clean fluid operations, such as water or other flushing fluids, and will not be part of a normal operational configuration. This configuration will allow for a controlled pressure reduction. Around the pressure reduction unit a heating chamber 20 is provided for heating the entire pressure reduction unit. It may be foreseen that only a part of the pressure reduction unit is heated. The purpose of the heater 20 is to increase/maintain the temperature of the pressure reduction unit and thereby be able to adjust the viscosity of the fluid in the pressure reduction unit, which again will have an influence on the pressure reduction due to the dependency on the viscosity. The control unit 16 is providing a control signal to the heating unit 20 through signal path 19.

Figure 5:
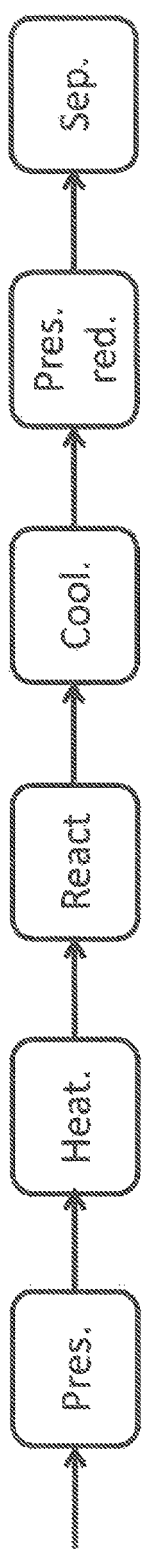
FIG. 5 is a flow-chart of a method according to the invention.

From FIG. 5 a schematic diagram of a high pressure process plant appears, where the pressure reduction device forms an important part of this. A fluid stream enters the processing plant and is pressurised and afterwards heated to a desired temperature. Pressure and temperature in such processes often exceeds 300 bar and 300 degree Celsius and may be even higher. After a reaction time in a reactor the fluid is cooled and the pressure must be reduced before a final separation of the individual components obtainable due to the stay in the reactor. The invention is a significant element in achieving a continuos process that may be performed at steady conditions for a long time with limited repair compared to existing pressure reduction devices.

For an automatic control including a predetermined control strategy where inputs are provided from the pressure sensor and where the control unit according to the predetermined control strategy opens or closed the on/off valves in the system and hence will establish a configuration of the pressure reduction devices in the pressure reduction unit that will ensure the desired output.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A pressure reduction unit comprising two or more pressure reduction devices for use in processing equipment handling high pressure fluid, where each of the pressure reduction devices comprises at least one tubular element with a first and a second end, arranged to receive a pressurized fluid at the first end and with a length and internal cross section adapted to reduce the pressure of the fluid to a predetermined level when leaving the second end, the pressure reduction devices being arranged and connected in series in a piping arrangement that directs the fluid to the pressure reduction devices,
where for one or more pressure reduction devices a flow bypass piping comprising an on/off valve is provided, adapted for opening or closing the bypass piping.

2. The pressure reduction unit according to claim 1, where the length, the cross sectional area and the number of tubular elements are chosen to achieve an average flow velocity within each tubular element of less than 30 m/s.

3. The pressure reduction unit according to claim 1, where the internal diameter of each tubular element is in the range 1 mm to 32 mm.

4. The pressure reduction unit according to claim 1, where the length of each tubular element is 10 m to 1000 m.

5. The pressure reduction unit according to claim 1, where pressure measuring devices are provided for measuring the pressure level before and after a pressure reduction device.

6. The pressure reduction unit according to claim 5, further comprising a control unit, where a pressure measuring device is adapted for providing an input to a control unit, where the control unit is adapted to provide a control signal to valve activation devices for opening or closing the on/off valve.

7. The pressure reduction unit according to claim 1, where the number of pressure reduction devices is at least 4, and where an on/off valve is placed in conjunction with each pressure reduction device.

8. The pressure reduction unit according to claim 1, where each of the pressure reduction devices reduces the pressure between 40% and 60% of the input pressure level.

9. The pressure reduction unit according to claim 1, where the pressure reduction unit comprises a pressure reduction device adapted for pre-operation procedures in which a medium to be pressure reduced is water.

10. The pressure reduction unit according to claim 1, where for one or more of the pressure reduction devices a heating device is provided for heating the pressure reduction device and hereby adjusting a viscosity of the fluid and hence adjust the pressure reduction.

11. The pressure reduction unit according to claim 1, where for one or more of the serially connected pressure reduction devices, a parallel coupled pressure reduction device is provided in a parallel piping arrangement and where valve means are provided for opening and closing the flow to the parallel coupled pressure reduction device.

12. The pressure reduction unit according to claim 1, where for one or more of the pressure reduction devices a flushing device is provided, capable of flushing the pressure reduction device when not in an operational mode.

13. The pressure reduction unit according to claim 1, where a filtering device is inserted in the piping upstream in relation to a first one of the pressure reduction devices arranged in series.

14. A method for reducing pressure in processing equipment handling high pressure and high temperature fluid streams with a content of abrasive components, the processing equipment comprising a pressure reduction unit according to claim 1, where the pressure reduction method comprises switching in or out one or more on/off valves in bypass streams and hence directing the fluid stream to a desired combination of pressure reduction devices.

15. The method according to claim 14, where the switching of on/off valves is controlled by a surveillance equipment receiving input from the fluid stream and switching in or out the on/off valves accordingly.

16. The method according to claim 14, comprising
  I. measuring the pressure in the fluid at a pressure reduction device;
  II. dependent on the pressure measurement performing one of steps III. or IV through operation of the control unit;
  III. directing the fluid to the pressure reduction device;
  IV. bypassing the pressure reduction device by opening the on/off valve in the bypass piping;
  V. repeating the step II. for each pressure reduction device until a predetermined pressure level has been reached.

17. The method according to claim 14, where the method comprises bypassing all but a final pressure reduction device in case the fluid in the processing equipment is a startup or close down fluid.

18. The method according to claim 14, where in one or more steps of the pressure reduction the temperature is controlled to remain within a desired range of temperature.

19. The method according to claim 18, where the temperature is controlled to remain between 100° C. and 300° C.

20. The method according to claim 19, where the temperature control comprises heating of one or more of the pressure reduction steps.

21. A processing plant comprising a pressure reduction unit according to claim 1, where the processing plant comprises on one side of the pressure reduction device a high-pressure liquid reaction zone and on another side of the pressure reduction device comprises a liquid separation zone.

* * * * *